A. W. GIAMPIETRO.
MACHINE FOR EXTRACTING ESSENTIAL OILS AND REMOVING PEELING FROM CITRUS FRUITS, &c.
APPLICATION FILED MAY 10, 1913.
1,116,880.
Patented Nov. 10, 1914.
2 SHEETS—SHEET 2.
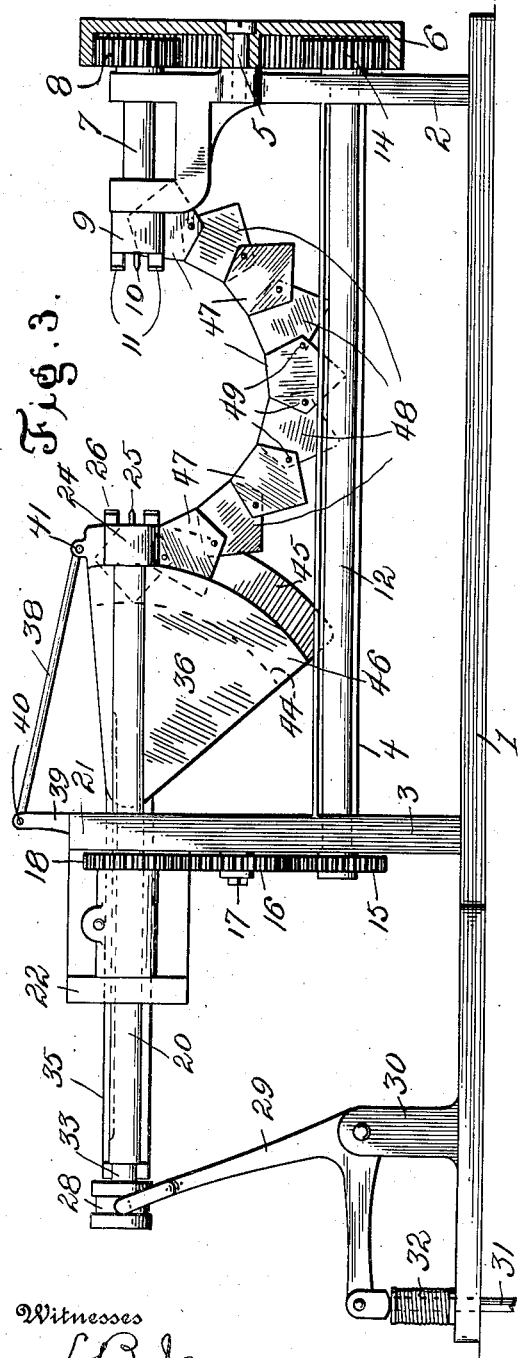
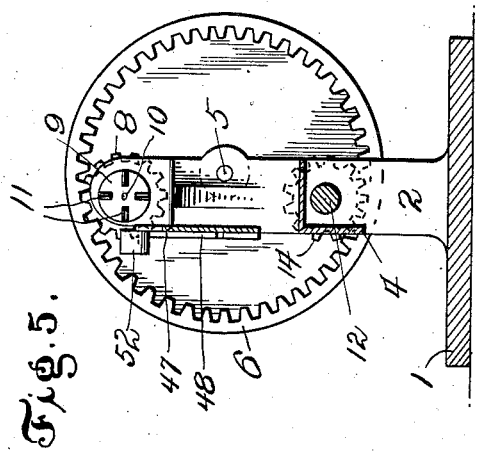
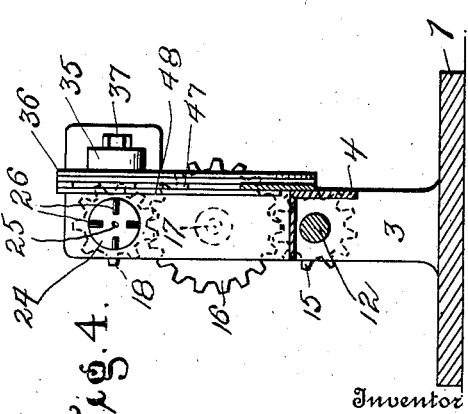
Witnesses
L. B. James
F. Kerols
Inventor
Aristide W. Giampietro
By Havell & Havell
Attorneys

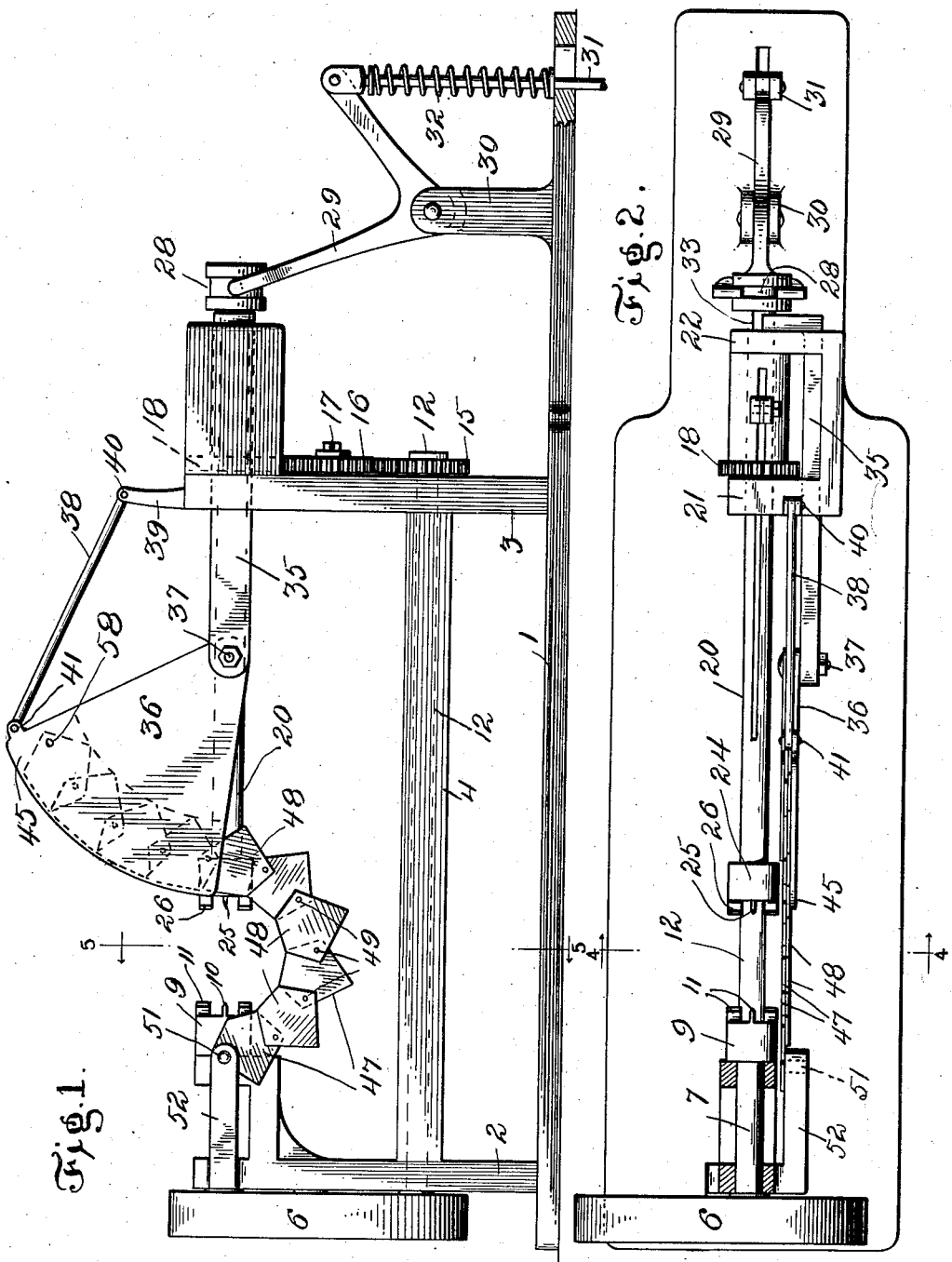

UNITED STATES PATENT OFFICE.

ARISTIDE W. GIAMPIETRO, OF TAMPA, FLORIDA.

MACHINE FOR EXTRACTING ESSENTIAL OILS AND REMOVING PEELING FROM CITRUS FRUITS, &c.

1,116,880.　　　Specification of Letters Patent.　　Patented Nov. 10, 1914.

Application filed May 10, 1913. Serial No. 766,897.

*To all whom it may concern:*

Be it known that I, ARISTIDE W. GIAMPIETRO, a citizen of the United States, residing at Tampa, in the county of Hillsboro and State of Florida, have invented new and useful Improvements in Machines for Extracting Essential Oils and Removing Peeling from Citrus Fruits, &c., of which the following is a specification.

The object of the invention is to provide a machine by means of which the essential oils of citrus fruits may be liberated from the vesicles containing the same and collected by sponges, and whereby the peel of such fruit may be removed. The invention, however, is not restricted to this one use as it is equally capable of operating upon wood, iron and other objects to shape the contour thereof, and to perform other operations thereon.

Reference will be had to the accompanying drawings forming a part of this specification and wherein like numerals of reference designate corresponding parts throughout the several views, in which:

Figure 1 is a front elevation of the machine, Fig. 2 is a top plan view thereof, Fig. 3 is a rear elevation thereof, and Figs. 4 and 5 end views in elevation.

In the drawings, reference numeral 1 designates the base which is suitably mounted and from which extend standards 2, 3, connected by a cross bar 4. In the standard 2 is journaled a shaft 5, upon which is mounted a master gear 6, the teeth of the latter being internal, and the outer surface of said gear serving as a belt pulley. The upper end of the standard 2 is forked and in the members thereof is journaled a spindle 7, provided on one end with a pinion 8 which meshes with the gear 6, and at the other end with a chuck 9, the latter having a center 10 and spurs 11. Journaled in the lower ends of the standards 2 and 3, is a transmission shaft 12, extending longitudinally of the machine and housed by the cross bar 4, the latter being in the nature of an angle or channel bar. At its opposite ends, the transmission shaft is equipped with pinions 14 and 15, the pinion 14 meshing with the teeth of the gear 6 and the other pinion 15 meshing with an intermediate pinion 16 journaled on a stub shaft 17 of the standard 3. The pinion 16 meshes also with a pinion 18 slidably keyed to a spindle 20. This spindle is slidably journaled in the bearing arms 21 and 22 of the standard 3 and has a chuck 24 complementary to the chuck 9 of the other spindle and equipped with the center 25 and spurs 26. At its rear end, the spindle 20 is provided with a grooved collar 28, in the groove of which fits a bell crank lever 29 pivoted to the base bracket 30 and operated by a rod 31 or other means. This rod is pivotally attached to one arm of the lever 29 and extends through a slot in the base plate, where it may be connected with a pedal (not shown) or other lever. Surrounding the rod 31 is a coil spring 32 whereby the spindle is normally forced toward its complementary spindle.

The spindle 20 adjacent the collar 28 is provided with a groove 33 in which fits the bent end of a bar 35, as seen in Fig. 2. This bar 35 passes through the bearing brackets 21, 22 and at its inner end pivotally supports a segment 36. The segment is pivoted to said arm or bar 35 at its apex by means of a bolt or pin 37 and to one extremity of the segment 36 is pivotally connected one end of a link 38, the other end of the link being pivotally connected to a bracket standard 39, the last mentioned pivot point being indicated by numeral 40 and the pivot connection between segment 36 and bar 35 being indicated by numeral 41. It will be noted that in Fig. 1, the pivot points 37, 40, and 41 form a triangle, and when the bar 35 shifts or slides endwise, the pivot point 37 correspondingly shifts and as the pivot point 40 remains unchanged, the pivot point 41 swings downward to the position illustrated in Fig. 3.

The segment 36 in its curved side is channeled at 44, the portion 45 on one side of the channel extending beyond the portion 46 on the other side thereof, and between these portions 45 and 46, which are really flanges, seat the blades of the knife to be described. The knife comprises a plurality of cutting blades 47, 48, the blades 47 alternating with those 48 and the adjacent ends of said blades overlapping and at that point being pivoted together by rivets 49. Thus it will be seen that the blades when connected together form a flexible knife, which when presented against an object will automatically adjust itself to the contour of such object. The end blades of this flexible knife are respectively pivoted at 58 and 51 to the upper corner of the segment 36 and the end of the arm 52, the latter being on the standard 2.

In operation, the object to be operated on, whether it be fruit, wood or other object, is chucked between the chucks 9 and 24 by operating the bell crank lever 29, the spring 32 holding the chucks against the object. If the object be large, the chuck 24 will not move as close to the chuck 9 as if the object were small. The centers 10 and 25 and spurs 11 and 23 bite into the object to cause the same to rotate with the spindles. Inasmuch as the bar 35 slides with the spindle 20 and the position of the spindle 20 is governed by the size of the object chucked, the pivot point 37 will change its position and accordingly change the position of the segment 36. In the elevated positions of the segment, the knife is drawn upwardly from one end causing the blades at that end to enter the channel 44 of the segment, thereby causing the blades which have not entered the channel to droop between the pivot point 51 and segment. The unentered blades, which are the ones that act on the object between the chucks, assume a regular curved formation on a radius agreeing with that of the said object. If the object be large, then the segment 36 will be lowered, due to the fact that the spindle 20 and bar 35 project less from the standard 3, and according the radius of the unentered knife formation becomes greater correspondingly with the radius of the object chucked. Motion is imparted from the master gear 6 through the pinion 8 to the spindle 7, and through the pinion 6, shaft 12, pinions 15, 16, 18 to the spindle 20.

In operating on citrus fruits, the blades, which may have their cutting edged formed to suit the work best, first attack the yellow portion of the rind wherein are located the vesicles containing the essential oil, and as these vesicles are punctured, the oil is liberated and is collected in sponges held by hand against the knives and fruit, after which the white portion of the peel is attacked by the knives and removed to any desired degree. In a similar manner, the knives act upon wood and other material, except, of course, the sponges are not employed.

Having fully described the invention, what is claimed as new is:

1. In a device of the character described, a rotatable chuck, a second rotatable chuck having a spindle mounted for endwise movement, a pivoted segment correspondingly movable with the spindle and its chuck, the relation of the pivotal point of the segment and the chuck being constant and the curved side of the segment being adjacent the second chuck, a flexible cutting member to act on the object chucked, one end of the cutting member being secured adjacent the first chuck and the other end being secured to one end of the curved portion of the segment.

2. In a device of the character described, a chuck rotatable in a standard, a flexible knife attached at one end to said standard, a second chuck, a spindle for the latter endwise movable in a standard, a segment pivotally mounted and having its pivot correspondingly movable with the spindle, the curved portion of the segment being adjacent the second chuck, a link pivoted to the segment and to one of the standards, the pivotal points for the link both being on the same side of the spindle, and the other end of the flexible knife being attached to the segment adjacent the point thereof to which the link is connected.

3. In a device of the character described, a chuck rotatable in a standard, a flexible knife attached at one end to said standard, a second chuck, a spindle for the latter endwise movable in a standard, a segment pivotally mounted and having its pivot correspondingly movable with the spindle, the curved portion of the segment being adjacent the second chuck, a link pivoted to the segment and to one of the standards, the pivotal points for the link both being on the same side of the spindle, and the other end of the flexible knife being attached to the segment adjacent the point thereof to which the link is connected, and spring means for moving the spindle and its chuck endwise, said spring means normally forcing the chucks together and correspondingly altering the knife formation.

4. In a machine of the character described, a support, rotatable chucks mounted upon the support for relative longitudinal movement to receive and hold objects of different sizes, means to rotate the chucks, a relatively stationary flexible cutter disposed in proximity to the chucks and spanning the space between the same, and means to increase and decrease the active cutting edge of the flexible cutter.

5. In a machine of the character described, a support, a rotatable chuck, means to rotate the chuck, a co-acting chuck, means to move one chuck toward and away from the other, a flexible cutter secured at one end near one chuck with its opposite free end mounted for longitudinal movement in proximity to the other chuck, and means to longitudinally move the free end of the flexible cutter.

6. In a machine of the character described, a plurality of devices to engage an object and rotate the same, a flexible relatively stationary cutter disposed near the devices to engage the object, a relatively stationary element connected with one end of the flexible cutter, and a movable element connected with the opposite end of the flexible cutter.

In testimony whereof I have hereunto set my hand in presence of two subscribing witnesses.

ARISTIDE W. GIAMPIETRO.

Witnesses:
CHARLES L. FONBIRT,
F. H. KIRTON.